Dec. 1, 1964 J. RUBIN 3,159,124

ELECTRICAL THREAD-TRIMMING DEVICE

Filed April 27, 1964 5 Sheets-Sheet 1

INVENTOR.
JULIUS RUBIN
BY [signature]

ELECTRICAL THREAD-TRIMMING DEVICE

Filed April 27, 1964 5 Sheets-Sheet 2

INVENTOR.
JULIUS RUBIN
BY
Saul J. Stree

*INVENTOR.*
Julius Rubin by [signature]

ATTORNEY.

Dec. 1, 1964 J. RUBIN 3,159,124

ELECTRICAL THREAD-TRIMMING DEVICE

Filed April 27, 1964 5 Sheets-Sheet 4

INVENTOR.
JULIUS RUBIN
BY [signature]

INVENTOR.
JULIUS RUBIN
BY Samuel Strol

United States Patent Office 3,159,124
Patented Dec. 1, 1964

3,159,124
ELECTRICAL THREAD-TRIMMING DEVICE
Julius Rubin, Roslyn, N.Y., assignor to Tek-Matic Corp., Albertson, N.Y.
Filed Apr. 27, 1964, Ser. No. 362,915
10 Claims. (Cl. 112—252)

The present application is a continuation-in-part of my copending application Serial No. 228,599, entitled Electric Resistance Thread Trimming Device, filed October 5, 1962, now United States Patent No. 3,142,279.

This invention relates to an electrical thread trimmer, and more particularly to a device in which a resistance element is utilized as the means of cutting or severing the thread.

Briefly stated, the present device is intended to be used in the place and stead of mechanical thread-trimming devices in which mechanical cutters of one kind or another are utilized. An important use of the present device is for trimming thread chain between articles of wearing apparel and accessories, as for example men's socks.

The device may be mounted on an over-seam sewing machine or the like, wherein the toes of socks are closed or other sewing operations are performed. It is particularly useful in connection with thread chains which connect a long series of individual pieces of work, as for example men's socks. The device is placed immediately adjacent the needle plate, and a suction or vacuum pump draws the thread chains into contact with the resistance element mounted within said device, and said thread chains are thereby quickly and cleanly trimmed away. The location of the resistance element relative to the mouth of the trimming device in which it is mounted, as well as other factors, determine the closeness of the trimming operation. Not only is the thread removed from the socks, but it is also carried away by suction to a thread collecting receptacle.

In the use of the present trimming device as above described, said trimming device is mechanically attached to the machine, and the chain thread is automatically drawn into contact with the resistance element by the attention on the part of the machine operator. However, another use of the present device is as a portable thread trimmer, held in the hand and brought into engagement with the work, such as garments in various stages of completion and other articles which are manufactured in whole or in part on sewing machines. Used in this manner, the present device takes the place of such mechanical trimming means as a pair of scissors.

In a third form of this invention, the present trimming device may be mounted in a fixed position, and the work may be moved manually across it. This would be the reverse of the manual action last above described, since in that case the work is held relatively stationary, as on a table, and the trimming device is moved manually across it, whereas in the present or third embodiment of the invention the trimming device is clamped to a stationary support such as a table and the work is held in the hand and moved manually across the trimming device. The action of the resistance element, however, remains the same in all three forms of the invention.

The invention is illustrated in the accompanying drawing, in which.

Figures 1, 2:
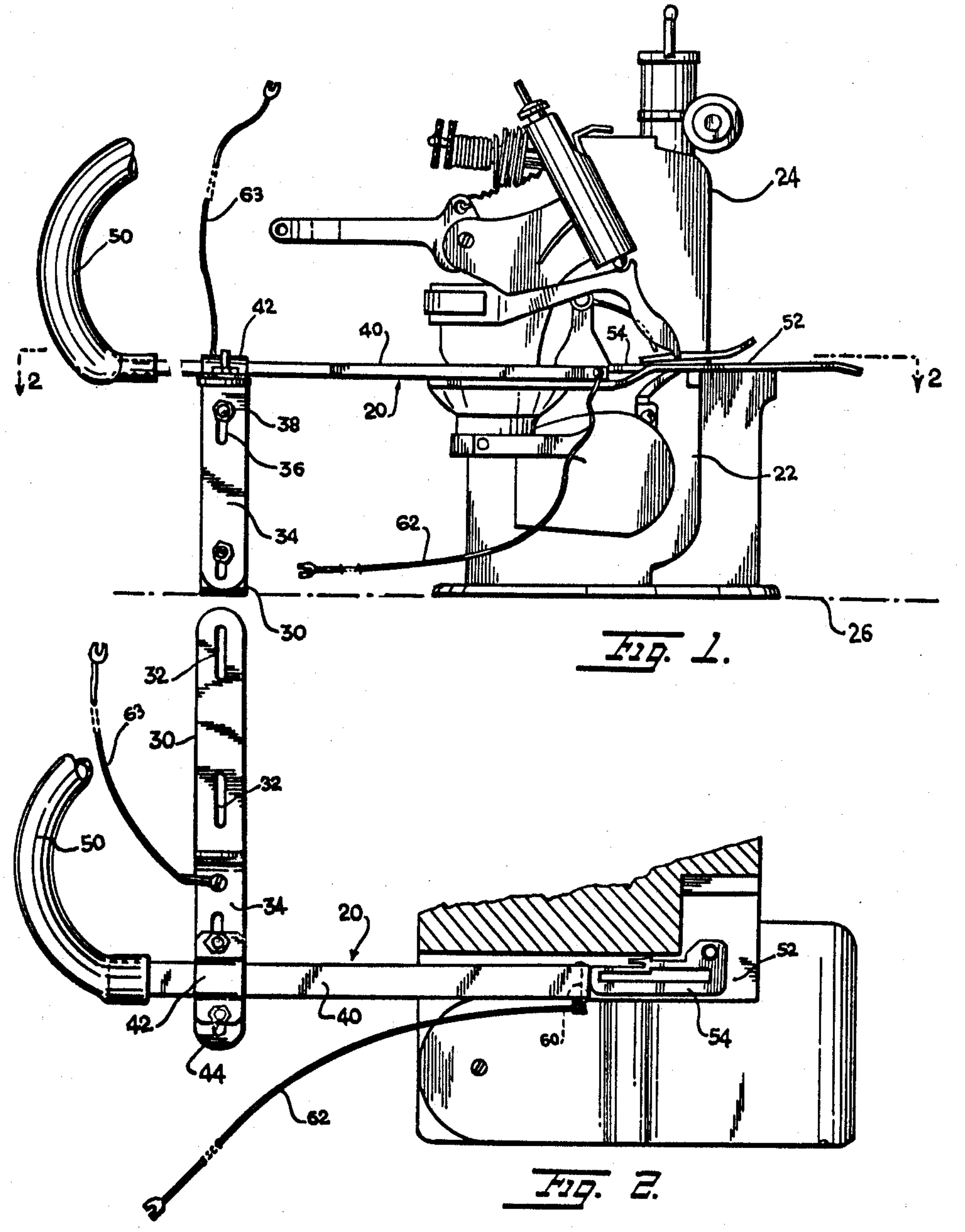
FIGURE 1 is a side view of a sewing machine on which the present device is mounted, both said machine and said device being supported on a sewing machine table.
FIGURE 2 is a fragmentary top view thereof.

Referring now to the details of the invention as illustrated in the accompanying drawing, it will be noted in FIGURES 1 and 2 that a thread-trimming device 20 made in accordance with this invention is mounted on the base 22 of a conventional sewing machine such as an over-seam machine 24. The base 22 of said sewing machine is supported on a conventional sewing machine table 26, and it will be observed that the present device, while mounted on said sewing machine, is actually mechanically supported on said table, although this means of support is obviously purely illustrative.

Specifically, an L-shaped bracket 30 having elongated slots 32 formed in its foot or base portion is mounted on said sewing machine table 26 adjacent said sewing machine. Screws or other conventional fastening means are provided in said elongated slots 32 in order to secure said bracket to said table, and it will be understood from the shape of said slots that the bracket may be adjusted relative to the sewing machine table and the machine mounted thereon, said adjustment being along a line extending longitudinally of said slots. A second bracket 34 of inverted L-shape is adjustably secured to the vertical portion of the first bracket 30. It will be noted that elongated slots 36 are formed in the vertical portion of bracket 34, and it is through said slots that screws or bolts 38 are provided to adjustably attach the vertical portion of bracket 34 to the vertical portion of bracket 30. This form of adjustment is vertical along a line extending longitudinally of the elongated slots 36.

The horizontal portion of inverted L-shaped bracket 34 supports a tube 40, which is one of the major components of thread-trimming device 20 herein described and claimed. Tube 40 is rectangular in cross-section or end view, being relatively shallow in one dimension and relatively wide in the other. This configuration is quite advantageous when the section tube is mounted on a sewing machine as herein described, the shallow dimension being the vertical and the wide dimension horizontal. This provides a relatively wide opening through which a relatively large volume of air may flow in order to insure adequate suction for the thread. The vertical dimension of the tube, being relatively small, precludes the tube from obstructing passage of the fabric through the sewing machine.

By way of illustration, the suction tube 40 may have an opening which is approximately 7/16 of an inch wide and 3/16 of an inch high. The wall is approximately .040 inch thick. These are purely illustrative dimensions and variations may be incorporated therein as desired. The wall thickness dimensions may be modified, as well as the dimensions of the tube opening, all to be determined by the particular needs of a given operation and other design factors. It will also be understood that the rectangular shape above mentioned is not critical, since other shapes will perform equally as well. A suction tube which is generally oval in cross-section illustrates other equally advantageous configurations. The wide dimension would be horizontal, and the narrow dimension would be vertical, in order to avoid obstrucing passage of the work.

A generally U-shaped clamping element 42, secured to the horizontal portion of bracket 34 by means of screws or bolts 44, adjustably clamps tube 40 in place on said bracket 34. It will be observed that said tube 40 is thereby mounted for horizontal adjustment longitudinally of its axial dimension.

It will thus appear from the foregoing description of the mounting means of thread-trimming device 20 that three adjustments are provided for accurately positioning said thread-trimming device relative to the sewing machine to which it is connected. The first bracket 30 is horizontally adjustable across the sewing machine table, the second bracket 34 is vertically adjustable toward and away from said sewing machine table, and tube 40 is horizontally adjustable transversely of the line of adjustment of the first bracket 30. These three adjustment means render it possible to position tube 40 in precisely the right place for maximum or optimum results.

Tube 40 is a suction tube which is connected at its outlet end (its left end as viewed in FIGURES 1 and 2) to a suction hose 50. This suction hose is preferably a relatively flexible plastic tube connected to a suction or vacuum pump and a receptacle adapted to receive the severed or trimmed thread. The suction means is entirely conventional and is therefore not shown in the drawing.

Suction tube 40 may be made of metal, such as brass, tubing generally rectangular in cross-section, or it may be made of clear glass tubing or extruded transparent plastic tubing. Glass or plastics would have the advantage of being good electrical insulators, and their transparency would be very useful in checking the operative efficiency of the device. For example, a thread-clogged tube could very readily impair the efficiency of the device, and the transparency above mentioned would render such condition visible to the operator's eye. This, of course, would enable him to take all necessary corrective measures.

The forward, or inlet, end of tube 40 is located immediately adjacent the needle plate 52 and feed dog 54 of the machine. The loose threads or thread chains 56 between articles 58 are thereby drawn into said inlet end of suction tube 40, where they are trimmed off by the means and in the manner hereinabove mentioned and hereinafter more fully described.

At the inlet end of suction tube 40 is a resistance wire 60 which is connected at one end by means of conductor 62 to the lower voltage side or coil 64 of a transformer 66. The wire extends horizontally across the wide dimension of the tube, closer to its upper wall than to its lower wall.

The high voltage side or coil 67 of said transformer is connected through suitable conductors 68, 70 and 72 to a suitable source of electric current such as a 115-volt power supply source. Between conductors 68 and 70 are a switch 74 and an adjustable resistance or rheostat 76. It is by this means that a relatively low voltage power supply is provided across resistance wire 60 and by which said wire is heated sufficiently to sever such thread or yarn which is brought into contact with it.

Figures 3, 4:
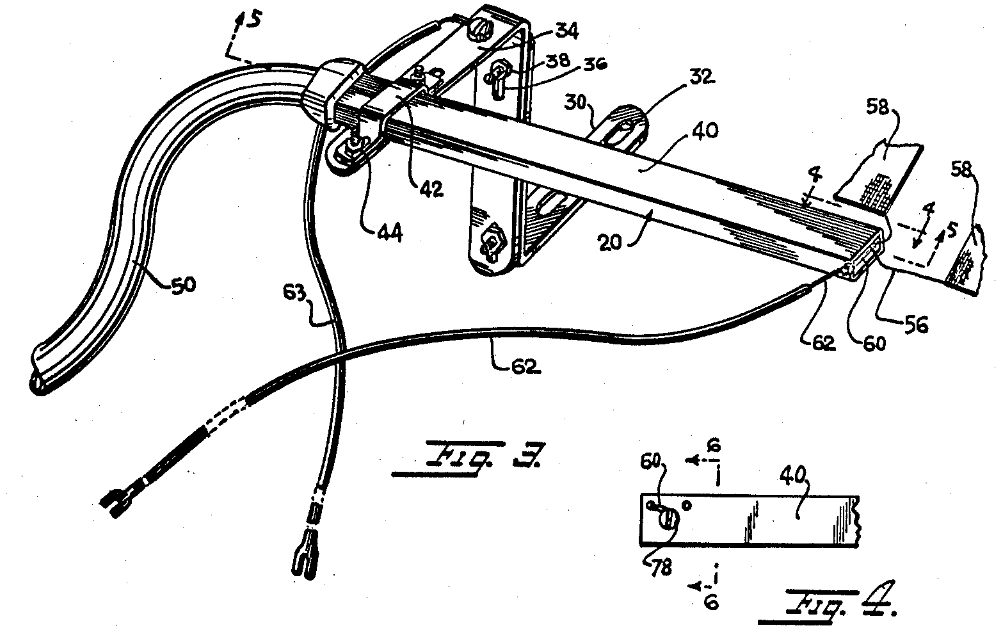
FIGURE 3 is a perspective view of the present device, showing its mode of operation with respect to a thread chain between two articles.
FIGURE 4 is a fragmentary side view of said suction device on the line 4—4 of FIGURE 3.
Figures 5, 6, 7:
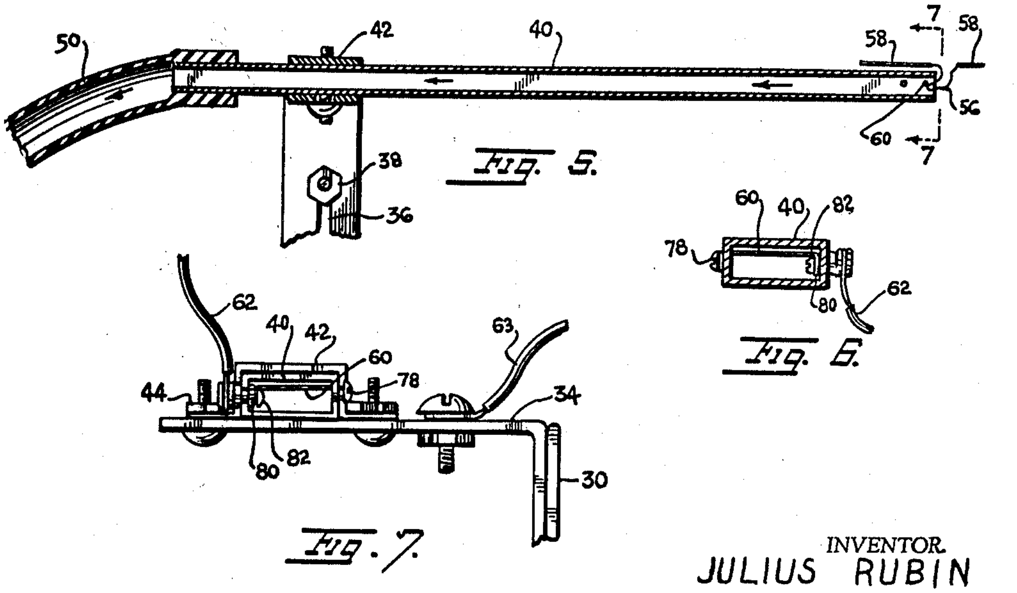
FIGURE 5 is a longitudinal section therethrough, on the line 5—5 of FIGURE 3.
FIGURE 6 is a transverse section on the line 6—6 of FIGURE 4.
FIGURE 7 is an end view on the line 7—7 of FIGURE 5.
Figure 8:
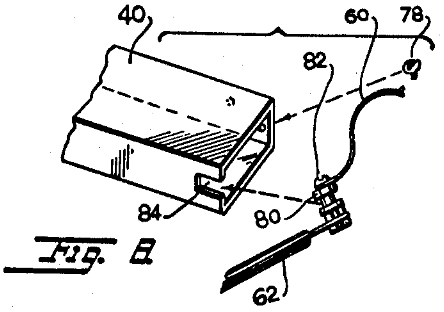
FIGURE 8 is a perspective exploded view of the inlet end of said trimming device, showing its resistance element removed therefrom.
Figure 9:
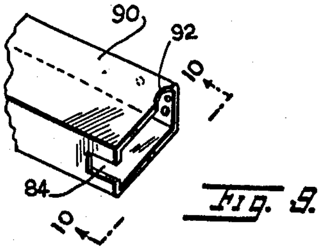
FIGURE 9 is another perspective view showing the inlet end of a thread trimmer embodying a modified form of this invention.
Figure 12:
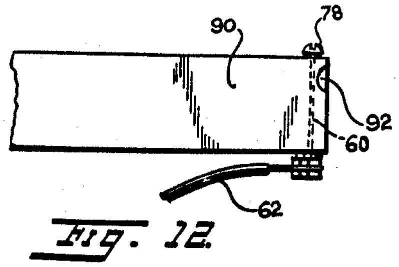
FIGURE 12 is a fragmentary top view thereof.
Figure 10:
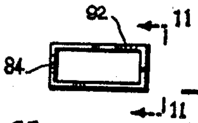
FIGURE 10 is an end view thereof on the line 10—10 of FIGURE 9.
Figure 11:
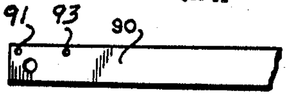
FIGURE 11 is a fragmentary side view on the line 11—11 of FIGURE 10.
Figure 13:
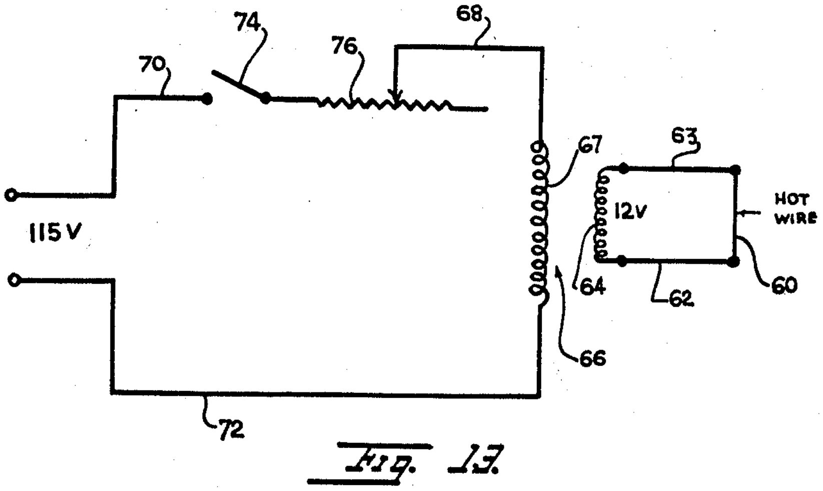
FIGURE 13 is a circuit diagram of the electrical circuit and components of the present device.

The resistance wire circuit may include suction tube 40 as a ground. In such case, of course, the suction tube would have to be made of conductive material such as brass. This is illustrated in FIGURE 8, wherein one end of resistance wire 60 is shown adapted to be affixed directly to one wall of suction tube 40 by means of a grounding screw 78. Referring now to the circuit diagram of FIGURE 13, conductor 63 is therein shown connecting one end of resistance wire 60 to coil 64. It will, of course, be understood that there are other components in this circuit, namely, suction tube 40 and at least bracket 34, since conductor 63 is connected to said bracket (as shown in FIGURE 3) and said bracket and said suction tube function as a ground between said conductor 63 and one end of resistance wire 60. In this installation insulation 80 is provided between the opposite end of resistance wire 60 and the suction tube 40. A screw 82 secures resistance wire 60 to conductor 62 and at the same time secures both to the suction tube 40. The insulator 80 also performs the function of insulating said screw 82 and said conductor 62 from said suction tube.

Figure 6A:
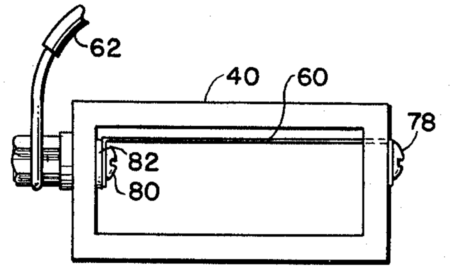
FIGURE 6A is an end view of the thread-trimming device shown in FIGURE 3.

A suction tube 40 is mounted so that the top surface, and particularly the top front edge, is flush with or below the needle plate 52 and in close proximity thereto, thereby enabling the resistance wire 60 to sever the threads attached to the fabric without burning the fabric. If the suction tube were to extend above the needle plate, the forward motion of the fabric could cause it to be pushed into the suction tube, resulting in burning of the fabric. However, this is a factor which is dependent upon the thickness of the fabric and it will be understood that in some cases the suction tube may be positioned above the needle plate without danger to the fabric. When the suction tube is level with or below the needle plate and in close proximity thereto, as shown by FIGURES 6D and 6E, the fabric passes over the suction tube without entering it. The threads readily enter the small space between said suction tube and said needle plate and are drawn into the suction tube where they are severed by the resistance wire 60.

The stitches are formed on the right side of needle plate 52 and the loose threads are drawn into the right side of the suction tube 40. It is to be noted that due to the thermal conductivity of the suction tube, the temperature of that portion of the resistance wire 60 which is adjacent the wall of the suction tube to which said resistance wire is grounded by the screw 78, is not optimum. This situation is remedied by the embodiment depicted in FIGURE 6B, wherein the resistance wire 60, instead of projecting straight across the suction tube 40, as shown in FIGURE 6A, is bent at a right angle and grounded at the bottom of said suction tube by screw 78 thereby giving the resistance wire an inverted L-shaped configuration and permitting said resistance wire to be heated at and around the right corner. It should be noted that the notch 79 in the bottom of the suction tube 40, as viewed in FIGURE 6B and 6C, is not essential to the operation of the resistance wire, but merely serves to facilitate the mounting of said resistance wire.

In some applications it may be desirable to have the suction tube abut the needle plate, the threads would then enter the suction tube from the right side of the needle plate and the right angle bend of the resistance wire would prevent any thread from passing through unsevered.

Figure 6B:
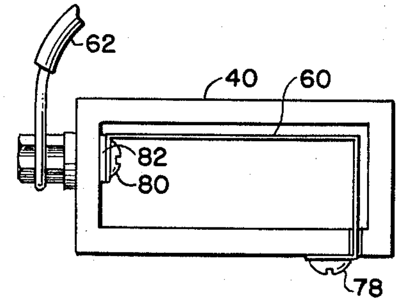
FIGURE 6B is an end view of the thread-trimming device, showing another embodiment of the resistance element depicted in FIGURE 6A.
Figure 6C:
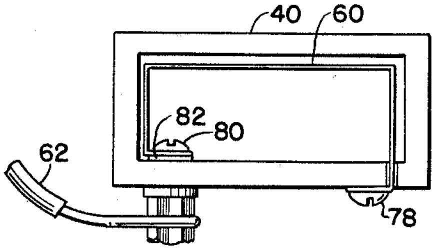
FIGURE 6C is an end view of the thread-trimming device, showing a third embodiment of the resistance element depicted in FIGURE 6A.
Figure 6E:
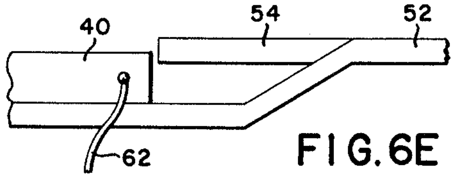
FIGURE 6E is a partial side view of another embodiment of the present invention showing the relative position of the thread-trimming device with respect to the needle plate of the machine.
Figure 6D:
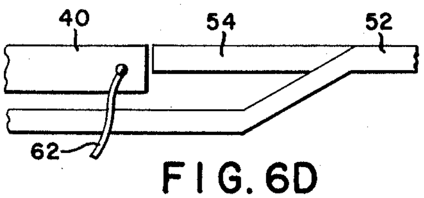
FIGURE 6D is a partial side view of one embodiment of the present invention showing the relative position of the thread-trimming device with respect to the needle plate of the machine.

Another embodiment of the resistance wire is illustrated in FIG. 6B, wherein the resistance wire has two right angle bends, and has an inverted U-shaped configuration.

It will be observed in FIGURE 8 that, except for a notch 84 which accommodates screw 82 and insulator 80, the inlet end of the suction tube is cut square. The resistance wire is held close to and across the mouth of said suction tube, and any threads which are sucked into said tube are brought into contact with said wire and severed at the point of contact. In FIGURES 9 to 12, inclusive, there is shown a suction tube 90 which corresponds in all respects to suction tube 40 except that it is provided with a small notch or cutout 92 at its inlet end. This notch channels or guides the threads, in certain sewing machine applications, to the resistance wire 60, and it helps position them transversely of said resistance wire in order to provide a square cut as close as possible to the fabric.

It will be noted that two holes 91 and 93 are provided in suction tube 90. These holes are intended to receive the resistance wire 60 in order to position said resistance wire either closer to or farther away from the suction opening of said tube, depending upon how closely it is desired to trim the thread. For example, the resistance wire may be passed through hole 91 and then wrapped around screw 78 to hold said wire in place. This would position the wire as close to the mouth opening as may be desired.

On the other hand, should so close a cut not be desired, the resistance wire would instead be drawn through hole 93 and once again wrapped around screw 78 to hold it in place. The resistance wire would thereby be supported at an angle to the mouth of the suction tube and considerably farther inwardly from its position when inserted through hole 91. This is purely illustrative, and it will be understood that additional holes may be provided in any desired positions for additional adjustment both of the position of the resistance wire and of the closeness of the cut.

Figures 14, 15, 16, 17, 18, 19:
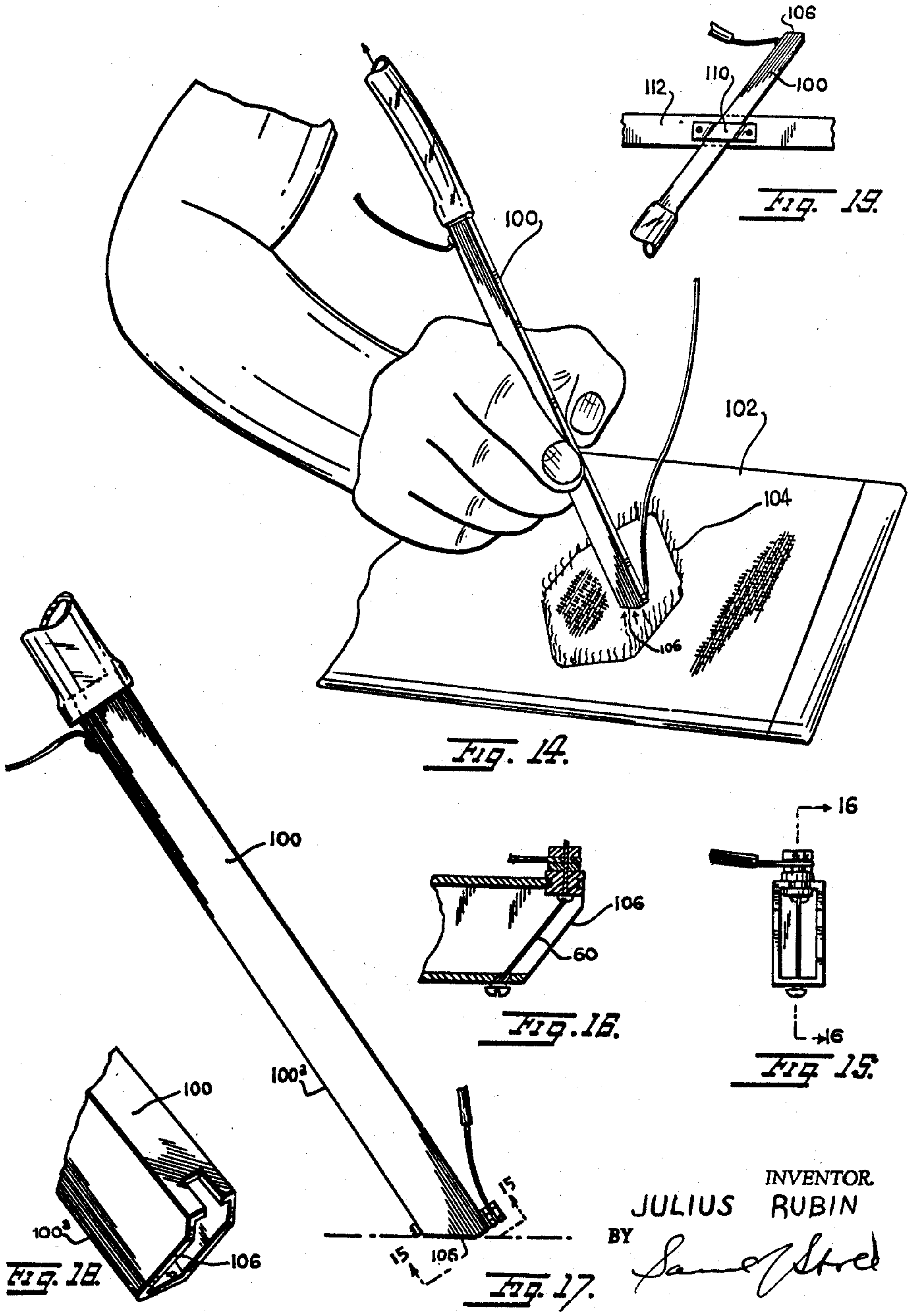
FIGURE 14 is a perspective view of a third form of the present device, showing it in use as a portable, manually operable thread trimmer.
FIGURE 15 is an end view of said device, on the line 15—15 of FIGURE 17.
FIGURE 16 is a fragmentary sectional view on the line 16—16 of FIGURE 15.
FIGURE 17 is a side view of said device.
FIGURE 18 is a fragmentary perspective view of the inlet end of said device with its resistance element removed therefrom.
FIGURE 19 is a fragmentary view of the same trimming device which is illustrated in FIGURES 14 to 18, but showing said device clamped to a fixed support such as a work table.

Reference will now be made to the second basic form of this invention, as illustrated in FIGURES 14 to 18, inclusive. In this embodiment of the invention, suction tube 100 is held in the hand and guided across the fabric 102, and more particularly across thread ends 104. The basic system remains the same, and the sole important modification resides in the beveled end 106 of the suction tube 100 and the parallel relationship of resistance wire 60 to said bevel. The wire is situated close to the mouth of the tube, to sever the thread as closely as possible to the fabric without damaging the fabric. This beveled end enables the user to hold the suction tube at a convenient angle relative to the horizontal, as for example 55 degrees from the horizontal, as illustrated in FIGURE 17. This means that the beveled end 106 is separated from adjacent side 100*a* of the suction tube to the extent of 125 degrees. These figures are, of course, approximate, and matters of design rather than principle. The angle thus described appears to be one of the most comfortable experienced.

In the use of this modified form of trimming device herein described and claimed, the suction tube 100 is held in the hand at the approximate angle above mentioned, and is guided across the work wherever it is desired to trim or remove loose thread ends from the cloth.

The very same device last above described may be used as a third embodiment of this invention, in the form of a fixed unit against which the work is moved. In the preferred use of this device it is supported in up-ended position as illustrated in FIGURE 19, although this is not an essential aspect of the invention. More specifically, a clamp 110 adjustably secures the suction tube 100 to a suitable stationary support such as the side edge of a table top 112. The suction tube is supported at an angle of 55 degrees relative to said table top, and consequently its beveled end portion 106 assumes a generally horizontal position. The work is held between the hands and moved horizontally across beveled end 106, thereby causing the thread ends to be sucked into said suction tube 100, where they are severed by the resistance wire.

It will clearly be understood that the angular relationships last above described are purely illustrative, and modifications may be incorporated therein in accordance with individual preferences and requirements.

The second and third embodiments of this invention may be designed to radically different dimensions from those which have above been mentioned as illustrating the first embodiment of the invention. The second and third embodiments may be used to sever a great many threads at the same time, instead of only a single thread as would normally be the case with the first form of the invention. Consequently, the suction tube in the second and third embodiments may be provided with a relatively wide mouth opening, for example, one or more inches in width, as desired. This would be in contrast to the inlet opening of the suction tube in the first form of the invention, which would normally be only a fraction of an inch wide. It will further be understood that in the second and third forms of the invention the resistance wire would normally be disposed midway between the two wide walls of the tube to provide the same trimming action irrespective of the relative directions of movement of the suction tube and the work.

The foregoing is illustrative of several preferred forms of the invention, and it will be appreciated that other forms may be provided and these forms may be modified within the broad principles of the invention and the broad scope of the claims.

What is claimed is:

1. In a sewing machine having a needle plate and stitch-forming instrumentalities, an electrical thread trimming device comprising a suction tube having inlet and outlet ends, suction producing means connected to said outlet end, a resistance wire disposed within and across said inlet end, means securing said suction tube adjacent said needle plate with the top portion of said inlet end being substantially flush with said needle plate, and a voltage power source connected across said resistance wire to heat it to thread severing temperature.

2. An electrical thread-trimming device in accordance with claim 1, wherein the resistance wire is positioned nearer the top than the bottom of said suction tube.

3. In a sewing machine having a needle plate and stitch-forming instrumentalities, an electrical thread-trimming device comprising a suction tube having inlet and outlet ends, suction producing means connected to said outlet end, a resistance wire disposed within and across said inlet end, means securing said suction tube adjacent said needle plate with the top portion of said inlet end positioned below said needle plate, and a voltage power source connected across said resistance wire to heat it to thread-severing temperature.

4. An electrical thread-trimming device in accordance with claim 3, wherein the resistance wire is positioned nearer the top than the bottom of said suction tube.

5. An electrical thread-trimming device in accordance with claim 4, wherein the resistance wire is disposed transversely within the inlet end of said suction tube.

6. An electrical thread-trimming device in accordance with claim 4, wherein the resistance wire has one end thereof connected to said suction tube thereby electrically grounding the resistance wire at said end.

7. An electrical thread-trimming device in accordance with claim 3, wherein the resistance wire is of inverted L-shaped configuration.

8. An electrical thread-trimming device in accordance with claim 3, wherein the resistance wire is of inverted U-shaped configuration.

9. An electrical thread-trimming device in accordance with claim 3, wherein the suction tube has a rectangular cross-section, one transverse dimension thereof being relatively shallow and the other transverse dimension thereof being relatively wide, said resistance wire extending across the relatively wide transverse dimension.

10. An electrical thread-trimming device in accordance with claim 9, wherein the resistance wire has a right angle bend at one end thereof, said end being connected to the bottom wall of said suction tube having the relatively wide transverse dimension.

References Cited by the Examiner

UNITED STATES PATENTS

| | | | |
|---|---|---|---|
| 1,054,520 | 2/13 | Eldridge. | |
| 3,058,438 | 10/62 | Russell. | |
| 3,109,399 | 11/63 | Hornberger. | |
| 3,125,052 | 3/64 | Spivey | 112—252 |

JORDAN FRANKLIN, *Primary Examiner.*